United States Patent [19]

Somerville

[11] Patent Number: 4,953,967
[45] Date of Patent: Sep. 4, 1990

[54] NASION-SECURED SPORT GLASSES

[76] Inventor: Walter D. Somerville, P.O. Box 223254, Carmel, Calif. 93922

[21] Appl. No.: 359,706

[22] Filed: May 31, 1989

[51] Int. Cl.⁵ ............................................. G02C 5/12
[52] U.S. Cl. .................................... 351/136; 351/156; 351/131
[58] Field of Search .............. 351/136, 138, 156, 157, 351/131, 132, 65, 78, 80, 87, 88

[56] References Cited

U.S. PATENT DOCUMENTS

| | | |
|---|---|---|
| 1,596,019 | 4/1926 | Nelson . |
| 1,819,738 | 8/1931 | Daniels . |
| 2,444,498 | 7/1948 | Cochran . |
| 2,449,694 | 9/1948 | Frolich . |
| 2,660,092 | 4/1953 | Bloom ................................ 351/156 |
| 2,774,279 | 6/1956 | Olson ................................. 351/94 |
| 3,189,913 | 6/1965 | Hoffmaster ....................... 351/130 |
| 3,209,366 | 9/1965 | Lindblom .......................... 351/130 |
| 3,391,976 | 7/1968 | Lindblom .......................... 351/130 |
| 3,584,939 | 6/1971 | Olson ................................. 351/132 |
| 4,405,214 | 9/1983 | Bolle .................................. 351/88 |
| 4,704,015 | 11/1987 | Gendal et al. ..................... 351/138 |

Primary Examiner—Paul M. Dzierzynski

[57] ABSTRACT

An ophthalmic device for use, in particular, in vigorous sporting activities, comprises a pair of lenses (11) mounted in a frame front (10), and held in position on the wearer's face by an adjustable flexible band (18). The band (18) is secured to the frame front (10) by lugs (16 L & R), mounted inside the frame front and perpendicular to the plane of the lenses (11). These lugs (16) are in horizontal alignment with a nasion protrusion (14) that is integral to a nose rest piece (12). The nose rest piece (12) is of a flexible material and is secured between the lenses (11) at the bridge area of the frame front (10). These glasses cannot fall from the wearer's face, and provide a no-slip, no-pitch, no-yaw fit. The glasses are extremely comfortable to wear for long periods of time.

8 Claims, 3 Drawing Sheets

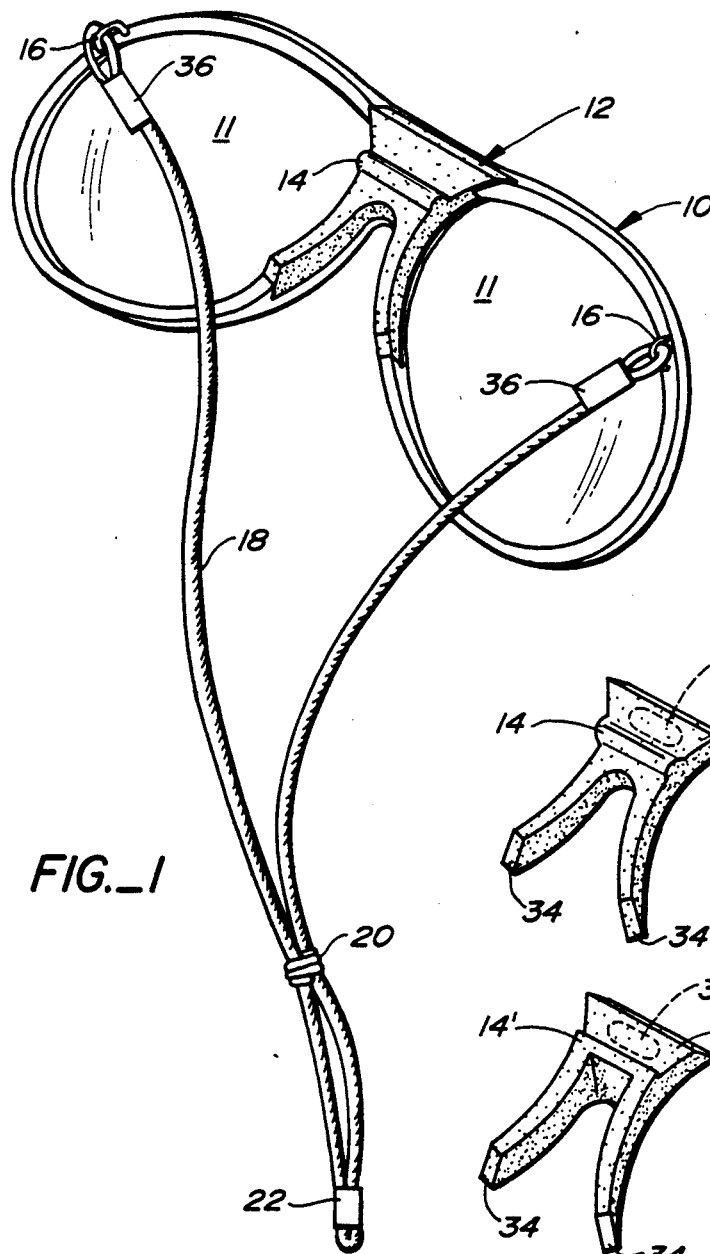
FIG._1
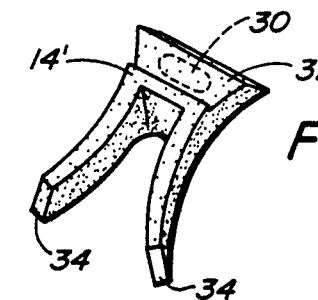
FIG._3A
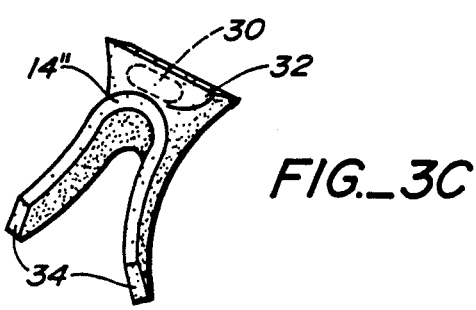
FIG._3B
FIG._3C

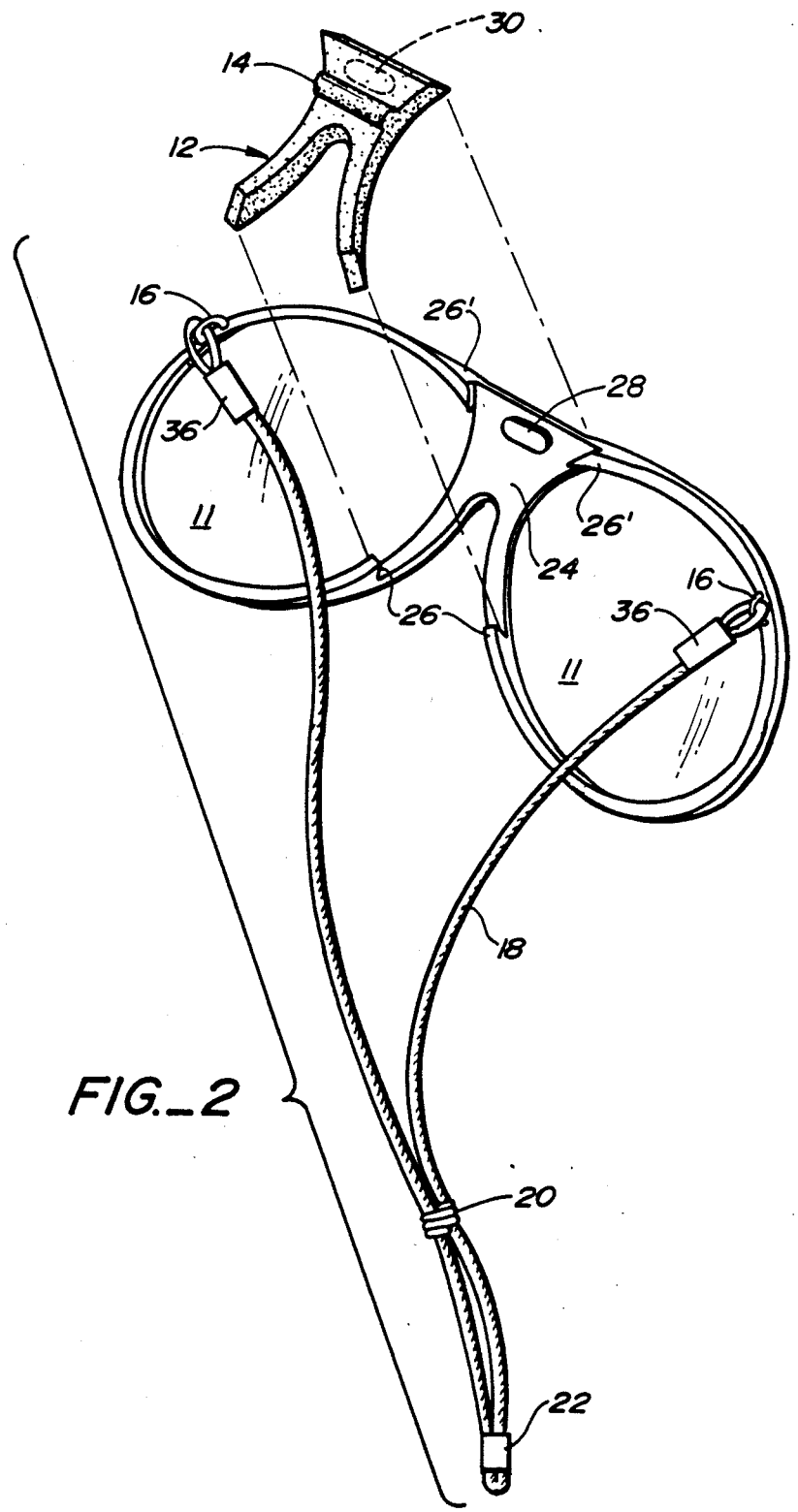
FIG._2

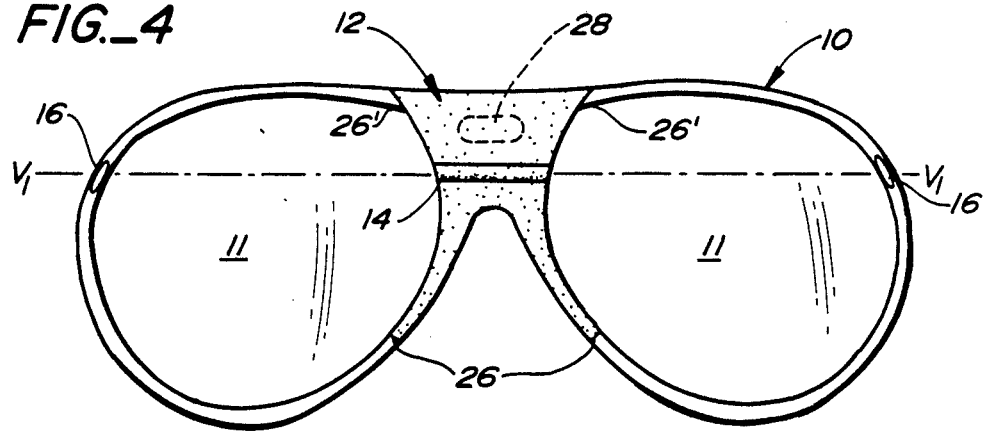
FIG._4
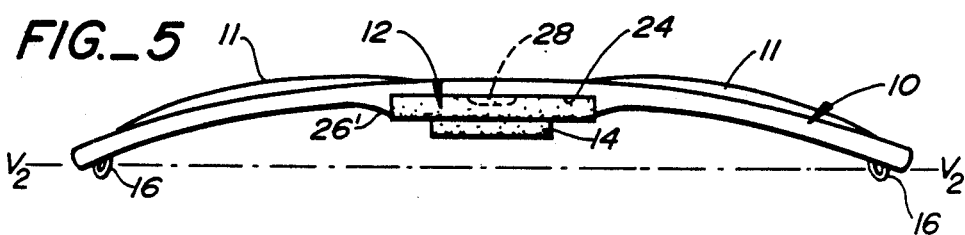
FIG._5
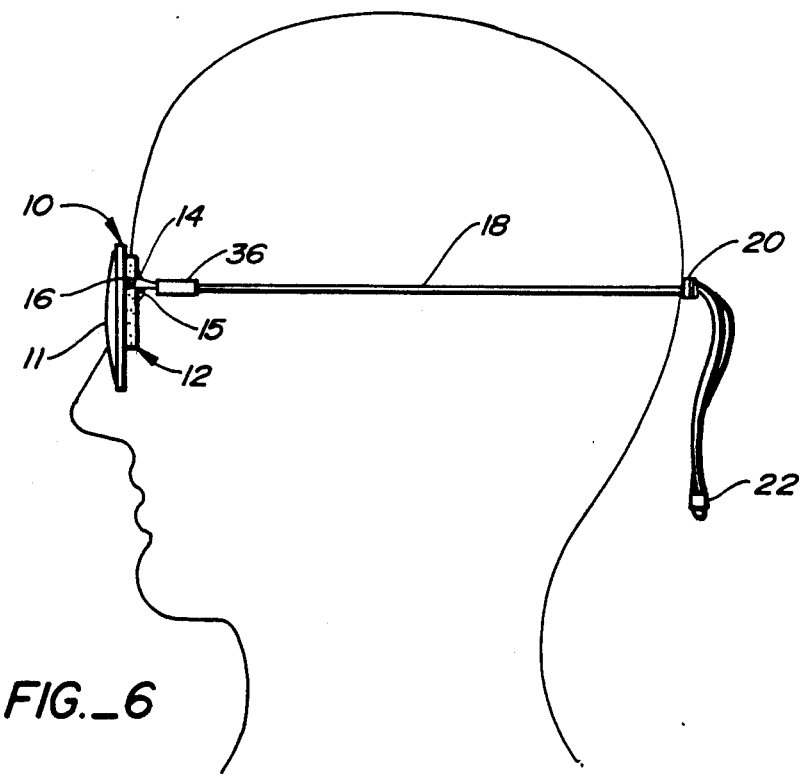
FIG._6

NASION-SECURED SPORT GLASSES

BACKGROUND—FIELD OF INVENTION

This invention relates to an ophthalmic device, specifically to glasses with sun or corrective lenses for use in sports or other vigorous activity.

BACKGROUND—DESCRIPTION OF PRIOR ART

The problems of conventional frame glasses, with both rigid temples and rigid nose pads, are well known and well documented. Rigid temples render conventional glasses uncomfortable to wear and allow them to slip and/or fall from the wearer's face. Conventional rigid nose pads also allow this slippage, are uncomfortable to wear for long periods of time, and mark the wearer's nose.

U.S. Pat. No. 2,660,092 to I. E. Bloom, 1953 Nov. 24, shows an eyeglass attachment consisting of an adjustable flexible band which solves the problem of rigid temples, but does not provide a wholly useful or comfortable pair of glasses. Bloom's attachment coupled with a rigid nose rest frame, results in glasses which pitch about the horizontal axis, and yaw about the vertical axis adjacent the wearer's face. The rigid nose pads are uncomfortable and mark the wearer's nose.

Numerous patents exist for flexible nose rests designed for glasses with rigid temples. However, none of those designs solve the special problems posed by glasses held upon the face by Bloom's adjustable flexible band.

OBJECTS AND ADVANTAGES

Accordingly, several objects of the present invention are to provide glasses, either sun, prescriptive, or protective, which do not slip or fall from the wearer's face, yet cannot pitch or yaw in planes about the wearer's face as with the above Bloom attachment alone. Additional objects are to provide glasses which are extremely comfortable to wear for long periods of time and which lie flat on the wearer's chest when not in use upon the face. Further objects and advantages will become apparent from a consideration of the drawings and ensuing description.

DRAWING FIGURES

FIG. 1 shows a perspective view of a pair of glasses according to the present invention.

FIG. 2 shows an exploded view of the glasses of FIG. 1.

FIG. 3A, 3B, and 3C show different nose rest pieces for the glasses of FIG. 1.

FIG. 4 is a rear of the glasses of FIG. 1.

FIG. 5 is a top view of the glasses of FIG. 1.

FIG. 6 is a diagrammatic profile of a person wearing the glasses of FIG. 1.

REFERENCE NUMERALS IN THE DRAWINGS

| | |
|---|---|
| 10 Frame Front | 11 Lens |
| 12 Nose Rest | 14 Nasion Protrusion |
| 15 Nasion | 16 Attachment Lug |
| 18 Flexible Band | 20 Annular Sliding Cinch |
| 22 Fixed Stop | 24 Bridge Area |
| 26 Shoulder Formations | 28 Locator Boss |
| 30 Locator Receptacle | 32 Flat Forehead Rest |

-continued

| | |
|---|---|
| 34 Nose Rest Legs | 36 Ferrule |

As can be seen in FIGS. 1 and 2, a pair of glasses according to the present invention comprise a pair of lenses 11 which are mounted in a frame front 10 in any suitable manner. A nose rest piece 12 made of a suitable flexible material, such as silicone, polyvinylchloride, or foam rubber, is secured between lenses 11 to the bridge area of frame front 10. Formed integrally on nose rest 12 is a nasion protrusion 14, which is shaped to fit into the wearer's nasion. A nasion is the concavity at the junction of the forehead and nose bridge. Protrusion 14 is a convex part which, when nose rest 12 is placed against the nasion, deforms slightly so as to conform and mate precisely with the convex shape of the nasion so as to hold the glasses in a fixed position. Above protrusion 14 is an essentially flat forehead rest 32 which fits against the wearer's forehead. Below protrusion 14 are nose rest legs 34 L & R which are shaped to straddle the bridge of the wearer's nose.

Two attachment lugs 16 L & R with respective eyelets are mounted on the inside at either end of frame front 10. These lugs are horizontally aligned with nasion protrusion 14, and are perpendicular to lenses 11. Lugs 16 may be integral to the frame front, or can be separate members which are glued or otherwise attached to front 10.

A flexible band 18 has two end loops which are interlocked with the eyelets in lugs 16 so that band 18 can swing freely about the eyelets. Band 18 is longer than the distance from right lug 16 R, around the wearer's head, and back to left lug 16 L. The excess length of band 18 can be gathered behind the wearer's head by a sliding annular cinch 20 (FIGS. 2 and 6). Cinch 20 can be slid along band 18 so as to adjust band 18 to fit snugly about the wearer's head. A fixed stop 22 is located at the end of the gathered portion of band 18 so as to prevent cinch 20 from sliding off band 18.

FIGS. 3A, 3B, and 3C show several different forms that nose rest 12 may take. Each form includes a flat forehead rest 32 which fits against the wearer's forehead, a prominent nasion protrusion 14 which mates with the wearer's nasion, and nose rest legs 34 L & R which are shaped to straddle the bridge of the wearer's nose.

These three portions of the nose rest cooperate to prevent movement of the glasses upon the wearer's face. The nasion protrusion may be formed separately from nose rest legs 34 L & R, as is protrusion 14 in FIG. 3A. Conversely, the nasion protrusion may be integral with legs 34 L & R, as are protrusions 14' and 14" of FIGS. 3B and 3C. Protrusion 14' of FIG. 3B forms a right-angled intersection with legs 34, while protrusion 14" of FIG. 3C forms a curved arch with legs 34. In any case, the nasion protrusion provides a ridge which fits into or mates with the wearer's nasion.

As shown by horizontal line $V_1$ of FIG. 4, lugs 16 and nasion protrusion 14 are horizontally aligned. Preferably this alignment is precisely horizontal so as to prevent pitching and yawing of the glasses upon the wearer's face.

As shown in the top view of FIG. 5, lugs 16 extend perpendicularly to a vertical plane $V_2$, which is generally parallel to lenses 11. I.e., the lugs extend perpendicularly to the plane of the paper in FIG. 4 and are angled in from the vertical. The ends of band 18 are loosely looped through the eyelet in each lug (FIG. 2) and are fastened upon themselves by ferrules 36 L & R. This fastening forms a large enough loop that the ends of band 18 can move freely through the eyelets of the lugs. This combination of positioning lugs 16 perpendicularly to the vertical with a freely moveable band 18 will allow the glasses to lie flat against the wearer's chest (not shown) when not in use, assuming band 18 extends around the wearer's neck.

FIGS. 2 and 5 show one method of securely and accurately mounting nose rest 12. Frame front 10 (FIG. 2) is formed with a thin bridge area 24 between lenses 11. Bridge area 24 is thinner from front to back than the rest of frame front 10 and is connected to the rest of the frame front by lower shoulders 26 and upper shoulders 26'. Thus bridge area 24 is recessed with respect to the rest of the frame front and is sized and shaped to mate with and thereby position nose rest 12. Bridge area 24 also has a male locator boss 28 which cooperates with a female locator receptacle 30 in nose rest 12 to properly position and secure nose rest 12. Nose rest 12 may be permanently attached to bridge area 24 by any suitable means, such as cement.

OPERATION

In operation, the wearer places the glasses on his or her face, positioning the nasion protrusion 14 in the wearer's nasion. After slipping band 18 over the head, the wearer creates equal tension on both slides of band 18 by pulling stop 22 back. The wearer then slides annular cinch 20 forward along the loop, tightening band 18 about the head. Finally the wearer releases cinch 20, leaving the glasses in position. FIG. 6 shows the glasses in position on a wearer's face, with nasion protrusion 14 held into nasion 15 by snugged band 18. The nasion protrusion thus mates with the nasion and deforms slightly due to horizontal alignment with snugged band 18 and mates with nasion 15 to hold the glasses in place and resist slipping or falling of the glasses. The tension of band 18 is thusly focused into nasion 15 and the glasses are balanced on both sides of protrusion 14 by forehead rest 32 and nose rest legs 34 L & R. The glasses cannot pitch, or move about the horizontal axis adjacent the wearer's face, because the forehead rest and nose rest legs hold them on the horizontal axis about the nasion protrusion. The glasses cannot yaw, or move about the vertical axis adjacent the wearer's face, because again the forehead rest and nose rest legs hold them on the vertical axis about the nasion protrusion. Flexible flat forehead rest 32 and flexible nose rest legs 34 L & R cooperate with the nasion protrusion to provide an extremely comfortable, no-slip, no-twist, no-yaw fit, even when the wearer is engaged in vigorous motion or activity.

When the glasses are upon the face, a simple forward pull on both lugs 16 and the adjacent area of front 10 will stretch band 18 in length, allowing the front to move forward off the wearer's face. The glasses may now be moved to the wearer's chest. In this position, the perpendicular mounting of lugs 16 with respect to the plane of lenses 11 assures that the glasses will lie flat upon the wearer's chest, safe from accidental damage.

CONCLUSION, RAMIFICATIONS, AND SCOPE

The reader will see that the glasses of the present invention provide maximum comfort by eliminating uncomfortable rigid temples and nose pads. Yet these glasses also provide a totally no-fall, no-slip, no-yaw fit, even when the wearer is engaged in vigorous activities. Pitching and yawing about the wearer's face, as is possible with the sole use of the above Bloom eyeglass attachment, has been totally eliminated. Also, the glasses lie conveniently flat on the wearer's chest when not in use, giving yet another advantage.

While the above description contains many specificities, these should not be construed as limitations on the scope of the invention, but rather as an exemplification of one preferred embodiment thereof. It is important to note the various configurations these glasses may take. The nose rest piece may be mounted in a separately formed frame, with two separate lenses, as in the present example. Alternatively, a nose rest piece may be mounted on a single goggle-type lens, with or without a frame. The lugs may be formed integrally or separately to either frame or lens. The locator boss may be integral or separate to either frame or lens, and also the shoulder formations may be integral or separate to either frame or lens. The adjustable flexible band may be permanently attached, or may be detachable to allow replacement.

Accordingly, the scope of the present invention should be determined not by the embodiment illustrated, but by the appended claims and their legal equivalents.

I claim:

1. An ophthalmic device, comprising:
   at least one lens,
   mounting means for holding said lens in front of the eyes of a wearer,
   a nose rest attached to a rear side of said mounting means facing said wearer,
   said nose rest made of a material having at least a small amount of flexibility, said nose rest having a configuration comprising an essentially flat forehead rest, a nasion protrusion below said forehead rest sized and shaped to mate with a human nasion, said nasion protrusion extending rearwardly from said flat forehead rest, and two legs sized and shaped to straddle a human nose bridge below said nasion protrusion, and
   holding means for urging said nasion protrusion into said nasion when said ophthalmic device is held by said mounting means in front of said eyes of said wearer, said holding means lying in a horizontal plane substantially aligned with said nasion protrusion, thereby to urge said nasion protrusion directly into said nasion and hence securely hold said ophthalmic device upon said wearer's face.

2. The ophthalmic device of claim 1 wherein said lens lies in a vertical plane in front of said wearer's face and wherein said holding means is oriented substantially perpendicularly to the plane of said lens.

3. The ophthalmic device of claim 1 wherein said holding means comprises an adjustable flexible band and a sliding cinch means on said band, said band being adjustable by said sliding cinch means, said band having opposite ends which are attached to said ophthalmic device, said ophthalmic device having a pair of attachment means comprising respective eyelets therein, said ends of said band being connected to said ophthalmic device through said eyelets.

4. An ophthalmic device, comprising:
   at least one lens,
   mounting means for holding said lens in front of the eyes of a wearer, a nose rest attached to a rear side of said mounting means facing said wearer, said nose rest made of a material having at least a small amount of flexibility, said nose rest having a configuration comprising an essentially flat forehead rest, a nasion protrusion below said forehead rest sized and shaped to mate with a human nasion, said nasion protrusion extending rearwardly from said flat forehead rest, two legs sized and shaped to straddle a human nose bridge below said nasion protrusion, an adjustable flexible band attached to said mounting means for urging said protrusion into said wearer's nasion when said lens is held by said mounting means in front of said wearer's eyes, a sliding cinch means on said band, said band being adjustable by said sliding cinch means, said flexible band having opposite ends which are attached to said mounting means by attachment means on said mounting means, said attachment means lying in a horizontal plane substantially aligned with said nasion protrusion, thereby to urge said nasion protrusion directly into said nasion and hence securely hold said ophthalmic device upon said wearer's face.

5. The ophthalmic device of claim 4 wherein said lens lies in a vertical plane in front of said wearer's face and wherein said attachment means is oriented substantially perpendicularly to the plane of said lens.

6. In an ophthalmic device, a nose rest made of a material having at least a small amount of flexibility, and being of a configuration comprising:

an essentially flat forehead rest, a nasion protrusion below said forehead rest, said nasion protrusion being sized and shaped to mate with a human nasion, said nasion protrusion extending outwardly from said flat forehead rest, and two legs sized and shaped to straddle a human nose bridge, said legs being positioned below said nasion protrusion.

7. The ophthalmic device of claim 6, further including at least one locator boss upon a bridge area of said ophthalmic device, a mating locator receptacle in said nose rest, said boss and said receptacle cooperating to accurately position said nose rest on said ophthalmic device.

8. The ophthalmic device of claim 6, further including an adjustable flexible band which urges said nasion protrusion into said nasion when said ophthalmic device is upon a wearer's face, said band having a sliding cinch means thereon, said band being adjustable by said sliding cinch means, the ends of said band being attached respectively to said ophthalmic device by a pair of attachment means with respective eyelets therein, said band ends being connected to said ophthalmic device through said respective eyelets, said attachment means being mounted on said ophthalmic device in a horizontal plane substantially aligned with said nasion protrusion, thereby to urge said nasion protrusion directly into said nasion and hence securely hold said ophthalmic device upon said wearer's face.

* * * * *